Patented May 12, 1942

2,282,540

UNITED STATES PATENT OFFICE 2,282,540

VITRIFIABLE COMPOSITION FOR DECORATING GLASSWARE

Alden J. Deyrup, Westfield, N. J., assignor to E. I. du Pont de Nemours & Company, Wilmington, Del., a corporation of Delaware No Drawing. Application June 30, 1941, Serial No. 400,563

2 Claims. (Cl. 106—49)

This invention relates to the decoration of articles of glassware by the application thereto of adherent coatings of vitrifiable enamels. More particularly, the invention relates to the decoration of articles made from glass, which glass has a coefficient of thermal expansion much below that of ordinary bottle or window glass, by the use of specially prepared vitrifiable compositions.

The art of applying vitrifiable decorations to glassware is an important one, and many advances have been made in this field in recent years. During this period it has become generally appreciated that the coefficient of thermal expansion of the vitrifiable enamel attached to the glassware article should match that of the base glass to a fairly accurate degree. Where there is a substantial difference between the coefficients of expansion of the enamel and the glass base to which the enamel is attached, a state of strain is set up in the glass during the cooling-down period, which strain seriously reduces the resistance of the resulting decorated piece of ceramic ware to both thermal and mechanical shock. In the art of decorating glass by the fusing thereon of vitrifiable low-melting enamels or glazes, the problem of adjusting the thermal coefficients of expansion of the enamel so as to match those ordinarily encountered with commercial types of bottle and window glass has made great progress. As far as the customary or usual types of glass are concerned, it may now be said that vitrifiable glaze compositions of suitable expansion characteristics are now available to the ceramic industry.

Under certain circumstances, however, glassware bodies having abnormally low coefficients of thermal expansion are employed. In general a glass of very low thermal expansion characteristics is used where it is desired to secure a product of special properties, such as an article having a specified resistance to the action of chemical agents, or an increased resistance to thermal shock. In attempting to apply a vitrifiable decorative coating to a glassware article having an unusually low thermal coefficient of expansion, it has been generally observed in the industry that most of the vitrifiable enamels now available are unsatisfactory. Their thermal expansion coefficients are not sufficiently low to permit satisfactory application to the glass base. The application of suitable vitrifiable glazes or enamels to glassware articles formed of glass having unusually low thermal expansion characteristics has constituted a distinct and as yet unsolved problem in the art.

As examples of glasses having unusually low thermal expansion characteristics, glasses the satisfactory decoration of which by the use of suitable vitrifiable enamel compositions is the principal object of this invention, it may be mentioned that a certain glass utilized commercially in the manufacture of glassware articles has a linear expansion coefficient ranging from $40 \times 10^{-7}$ to $45 \times 10^{-7}$. This abnormally low coefficient of thermal expansion is to be compared with the linear coefficient of ordinary bottle glass, which ranges from $80 \times 10^{-7}$ to $95 \times 10^{-7}$. The usual highly heat-resistant glassware, sold commercially under the trade-mark name "Pyrex," generally has a coefficient of expansion of $30 \times 10^{-7}$, or only slightly less than that of the glasses employed commercially for the manufacture of glassware articles whose decoration by means of suitable vitreous enamel compositions forms the primary aim of this invention.

Accordingly, it may be said that the principal object of my invention is to produce a vitrifiable enamel composition which may be fired and applied on a base glass having an abnormally low coefficient of expansion, a coefficient ranging generally from $40 \times 10^{-7}$ to $45 \times 10^{-7}$, this enamel when so applied resulting in a finished decorated article which is not subject to a strain so severe as to materially weaken the article when subjected to thermal and/or mechanical stresses. In addition to having suitable expansion characteristics, the vitrifiable enamels with which this invention is particularly concerned must mature at the usual temperatures in an ordinary glass decorating lehr to a smooth, resistant coating having a satisfactory gloss.

My improved vitrifiable enamel of low expansion characteristics, in common with the usual vitrifiable enamels suitable for decorating glassware articles, consists of a flux mechanically mixed with a pigment. The properties of the flux composition mainly determine the physical and chemical properties of the finished enamel, the pigment being present merely for the purpose of imparting the desired coloration thereto.

I have found that a satisfactory flux composition having the necessary low thermal coefficient of expansion may be prepared by fusing together the ingredients necessary to yield a product of the following composition:

|  | Per cent |
|---|---|
| Lead oxide (PbO) | 21.0–32.5 |
| Zinc oxide (ZnO) | 30.0–41.5 |
| Boric oxide ($B_2O_3$) | 21.0 |
| Silica ($SiO_2$) | 8.5 |
| Sodium oxide ($Na_2O$) | 2.5 |
| Cadmium oxide (CdO) | 4.0 |
| Titanium dioxide ($TiO_2$) | 1.5 |

It should be noted that the sum of the lead oxide and zinc oxide percentages in the flux should equal substantially 62.5%. Thus, if there is 21.0% lead oxide present, the zinc oxide content should be 41.5%. Similarly, if the zinc oxide content is 30.0%, the lead oxide content should be substantially 32.5%.

It may be noted that the flux composition that I find most satisfactory and which may be regarded as my preferred vitrifiable flux composition will have substantially the following composition:

| | Per cent |
|---|---|
| Lead oxide (PbO) | 21.0 |
| Zinc oxide (ZnO) | 41.5 |
| Boric oxide ($B_2O_3$) | 21.0 |
| Silica ($SiO_2$) | 8.5 |
| Sodium oxide ($Na_2O$) | 2.5 |
| Cadmium oxide (CdO) | 4.0 |
| Titanium dioxide ($TiO_2$) | 1.5 |

The necessary oxidic ingredients, or raw materials decomposing and yielding the specified oxides, are mixed dry and melted at a temperature in the neighborhood of 1100° C. to a clear, homogeneous liquid, following the procedure normally employed in the preparation of fluxes for vitrifiable enamels. When the melting is complete the liquid product is run into cold water, which shatters it into small pieces suitable for grinding in a ball mill. The flux in this form is then mixed with a suitable ceramic pigment and ground to a fine state of subdivision in a ball mill. It is then dried and sifted. It is now ready for application to a glass object to be decorated by any of the usual decorating methods known in the art, such as my spraying, stenciling, banding, squeegee methods, etc. When matured on the glassware article by heating, it forms a glossy, adherent decorative coating which coating has substantially the same thermal coefficient of expansion as the low thermal expansion type glass to which it is attached.

The above-described vitrifiable flux compositions have been found to provide enamels which can be applied to glassware of low expansion characteristics without producing any undesirable strain therein, such a strain, for example, that might result in poor resistance to thermal and mechanical stresses. To my knowledge this result has never before been achieved in the decoration of glassware articles of low linear expansion coefficients by the use of vitrifiable fluxes or enamels.

I claim:

1. A low-melting vitrifiable flux, suitable for application to glassware of low expansion characteristics, said flux having substantially the following composition: lead oxide 21.0 to 32.5%, zinc oxide 30.0 to 41.5%, boric oxide 21.0%, silica 8.5%, sodium oxide 2.5%, cadmium oxide 4.0%, titanium dioxide 1.5%, said lead oxide and zinc oxide content totaling together 62.5%, all said percentages being by weight based on the total weight of said flux.

2. A low-melting vitrifiable flux, suitable for application to glassware of low expansion characteristics, said flux having substantially the following composition: lead oxide 21.0%, zinc oxide 41.5%, boric oxide 21.0%, silica 8.5%, sodium oxide 2.5%, cadmium oxide 4.0%, titanium dioxide 1.5%, all said percentages being by weight based on the total weight of said flux.

ALDEN J. DEYRUP.